S. G. REED.
Wagon Tire Heater.
No. 39,357. Patented July 28, 1863.
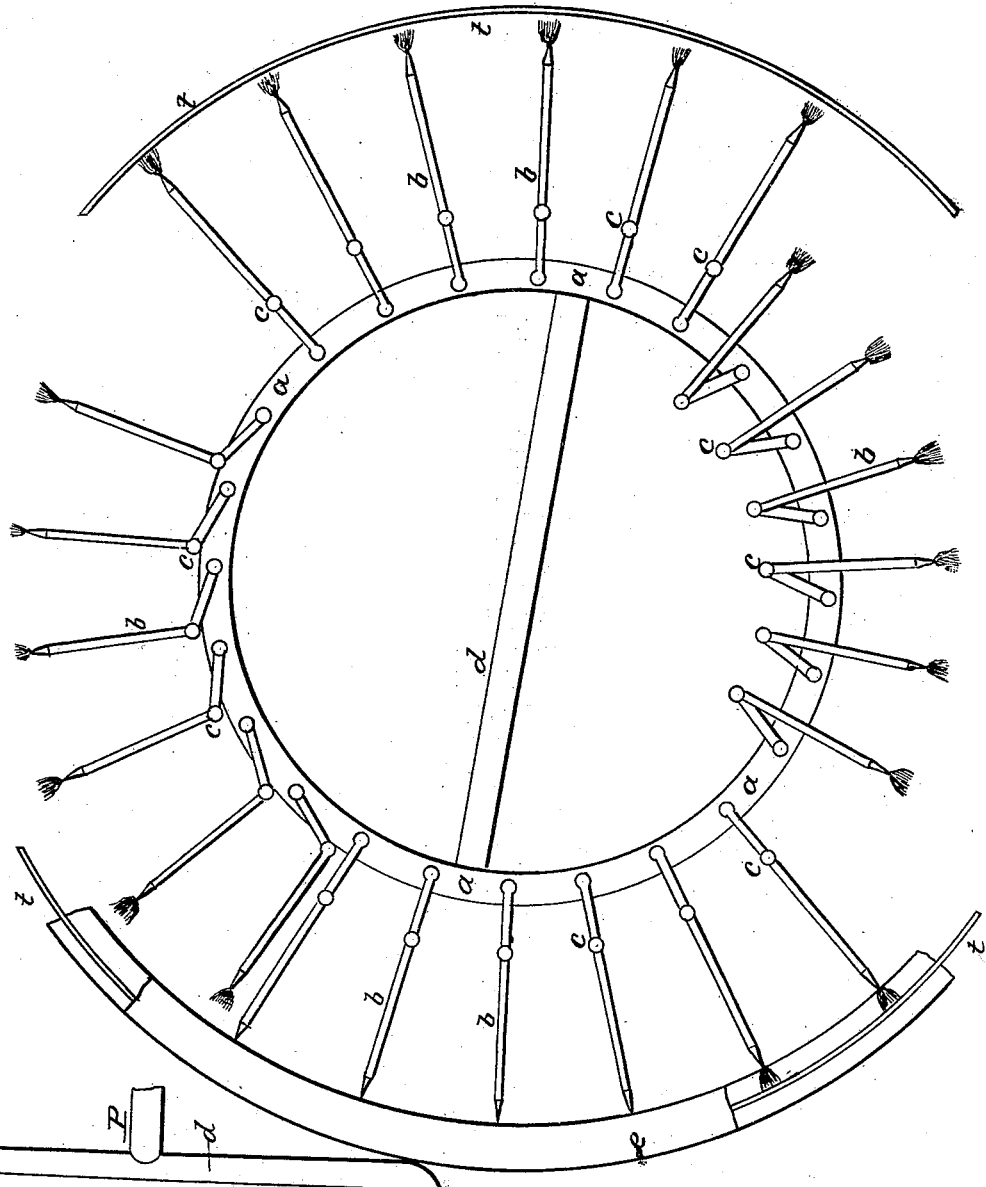

UNITED STATES PATENT OFFICE.

SAMUEL G. REED, OF WORCESTER, MASSACHUSETTS.

IMPROVEMENT IN APPARATUS FOR HEATING WAGON-TIRES.

Specification forming part of Letters Patent No. 39,357, dated July 28, 1863.

*To all whom it may concern:*

Be it known that I, SAMUEL G. REED, of the city and county of Worcester, and Commonwealth of Massachusetts, have invented a new and improved process and apparatus for heating tire by gas; and I do hereby declare that the following is a true and exact description thereof, reference being had to the accompanying drawings, and to the letters of reference thereon marked, in which—

Figure 1 denotes a plan view of the apparatus with a section of the table, covering, and tire in the position for being heated. Fig. 2 denotes a section of the same.

The object of my invention is to facilitate the setting of tire upon wheels by the use of gas in heating them for their expansion, and thus obviate the difficulties connected with the old process, which is usually conducted in the open air, using a wood or coal fire, which exposes buildings in the vicinity, and in cities is a source of annoyance; besides, the even distribution of heat throughout the tire, which is desirable, can not be obtained by the old as well as by my process. I accomplish this object in the following manner: From a circle formed by gas pipe, Fig. 1, *a*, there radiate any sufficient number of arms, *b*, (or smaller pipes,) with joints *c*, in order to adapt the apparatus to any size of tire. The pipe *d* is connected with the circle, and through it the gas is conducted to supply the jets. The tire *t*, Fig. 2, rests upon the table *m*. The covering *e* is placed over it to confine the heat and make it more available. The jets of flame are brought in contact with the tire.

The jets may be applied upon the inner surface of the tire, or upon the under edge, or upon the external surface, in the latter case the circle being sufficiently large to admit the tire within its own circumference.

The covering *e* may be so constructed as to be susceptible of expansion and contraction to adapt it to all sizes of tire.

The whole apparatus may be used in any room where gas can be used with safety and without inconvenience.

The application of gas for heating tire has never before been known, and is of great importance, as my experience has already demonstrated.

Having thus described my process and apparatus for heating tire, what I claim as original and desire to secure by Letters Patent, is—

1. The application of gas for heating tire.
2. The apparatus for heating tire, when constructed in the manner, or its equivalent, substantially as and for the purposes set forth.

SAMUEL G. REED.

Witnesses:
 JOHN G. KENDALL.
 L. B. STORS.